May 31, 1949.　　　　W. A. MORAN　　　　2,471,643
FOOD GRATER WITH HORIZONTAL AXIS DISK
Filed April 28, 1947　　　　2 Sheets-Sheet 1

W. A. Moran
INVENTOR

BY C. A. Snow & Co.
ATTORNEYS

May 31, 1949. W. A. MORAN 2,471,643
FOOD GRATER WITH HORIZONTAL AXIS DISK
Filed April 28, 1947 2 Sheets-Sheet 2
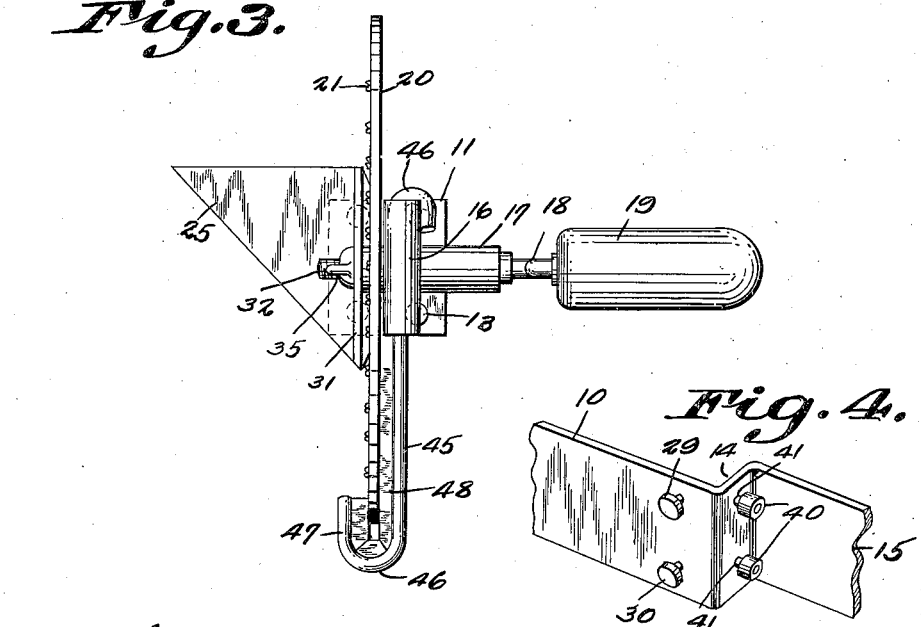
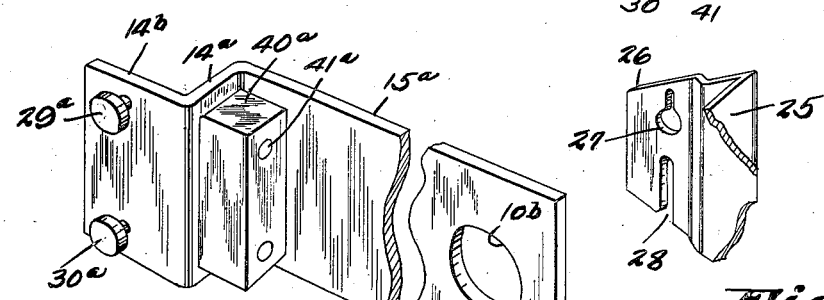
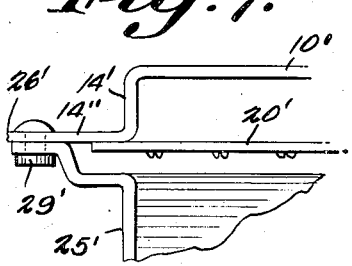
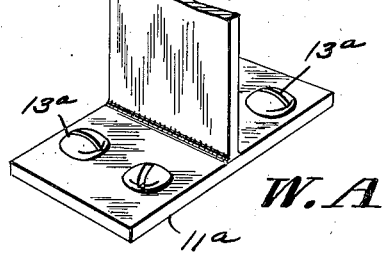
W. A. Moran
INVENTOR
BY C. A. Snowles
ATTORNEYS.

Patented May 31, 1949

2,471,643

UNITED STATES PATENT OFFICE 2,471,643

FOOD GRATER WITH HORIZONTAL AXIS DISK

Wilson A. Moran, Antigo, Wis.

Application April 28, 1947, Serial No. 744,384

1 Claim. (Cl. 146—177)

This invention relates to a food grater, and more particularly to such a grater embodying a vertical type rotatable disc.

A primary object of the invention is the provision of an improved food grater characterized by means enabling the same to be mounted on a wall, and having a rotatable disc, thus eliminating the necessity of holding the grater steady, or holding the material to be grated tightly thereagainst.

An additional object of the invention is the provision of an improved rotary disc grater characterized by means supporting the peripheral point of the disc adjacent the food to be grated in such manner as to obviate the necessity of use of extensive manual pressure.

An additional object of the invention is the provision of means in association with such a disc-type grater for removing grated food therefrom substantially continuously, and in a desired locality.

A still further object of the invention is the provision of such a device which is sturdy and durable in construction, reliable and efficient in operation, relatively simple to manufacture, assemble and utilize, and which may be readily adjusted to a variety of positions for the grating of a variety of types of food products as may be necessary.

With the foregoing and other objects in view which will appear as the description proceeds, the invention consists of certain novel details of construction and combinations of parts, hereinafter more fully described and pointed out in the claim, it being understood that changes may be made in the construction and arrangement of parts, without departing from the spirit of the invention as claimed.

Referring to the drawings

Figure 3 is an end elevational view of the construction of Figures 1 and 2.

Figure 4 is an enlarged fragmentary perspective view of a portion of the supporting bracket for the device.

Figure 5 is a fragmentary perspective view of a portion of the food guiding chute, showing the method of connecting the latter to the supporting bracket.

Figure 6 is a fragmentary perspective view, partially broken away, of a modified form of supporting bracket.

Figure 7 is a fragmentary top plan view of a further modified construction.

Similar reference characters refer to similar parts throughout the several views of the drawings.

Figure 1:
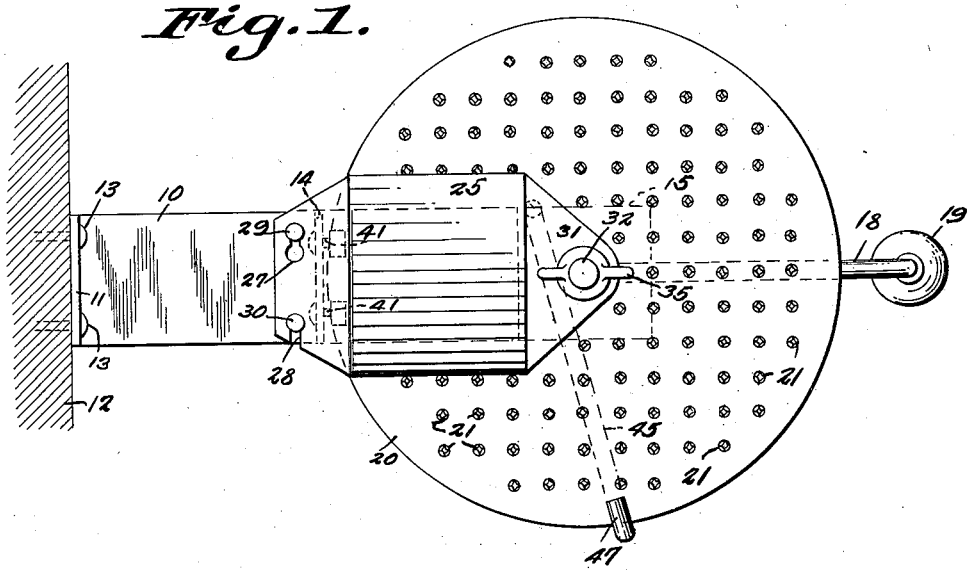
Figure 1 is a side elevational view of one form of the device embodying features of the instant invention, certain concealed portions thereof being indicated in dotted line.

Referring now to the drawings in detail, there is shown at 10 a bracket adapted for the support of a grater embodying features of the instant invention, including a transverse plate 11 adapted to be secured to a wall 12 in any desired manner as, for example, by screws 13. Bracket 10 is provided with an offset portion indicated at 14, including a horizontally extending portion 15, and terminating in a reversed loop portion 16, the bracket assembly being constructed, preferably of sheet metal, although any other desired material may be utilized as desired. The extremity of the portion 15, and the adjacent end of the loop 16 are provided with aligned apertures, through which extends a cylindrical member 17, comprising a portion of a crank assembly including a crank shaft 18 and a handle 19. The cylindrical portion 17 is adapted to extend completely through the apertures of portions 15 and 16, and have secured thereto a circular grating disc 20, the latter being provided on its inner face with a plurality of perforations or cutting projections 21, projections being arranged in rectangular pattern relative to the disc 20, thus avoiding the cutting or grating of food in cylindrical ridges, as is customarily the case when such cutting teeth are arranged in concentric rings on the disc.

A food guiding chute 25 is provided, and includes a flange 26, having a bayonet slot 27 therein, and an elongated slot 28. The slots are adapted to be fitted over spaced studs 29 and 30 respectively carried by the adjacent face of support 10, the arrangement being such that the chute may be readily applied to the studs and removed therefrom by vertical movement thereof.

The opposite end of the food chute also includes a flange 31, provided with an aperture, through which is adapted to pass a threaded extension 32 of crank shaft member 18, which passes through the cylindrical member 17. A suitable washer 33 may be positioned interiorly of the flange 31, and seated against cutting disc 20, the thickness of the washer being varied, as desired, in accordance with the food to be grated. A wing nut 35 or other desired fastening device is adapted to be secured on the extremity of the shaft 32, for holding the parts in related assembly.

Figure 2:
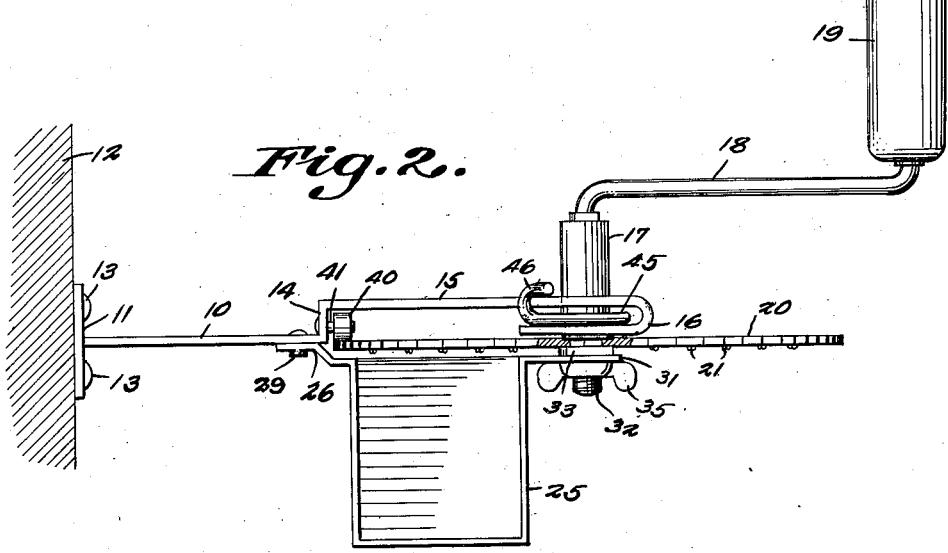
Figure 2 is a top plan view of the construction shown in Figure 1, certain portions thereof being broken away.

Supporting means are provided for the inner face of the disc at a peripheral point adjacent the point of maximum pressure thereon, that is adjacent to the food chute 25, and take, in one modification of the device as best shown in Figures 2 and 4, the form of rotatable rollers 40, mounted on sub-axles 41, secured to the inner face of offset portion 14, and adapted to be engaged by the periphery of the disc.

Means are provided for removing grated food from the periphery of the disc, and may take a variety of forms. In the illustrative embodiment shown, the construction takes the form of a rib or rod 45, provided at its upper extremity with a hook-shaped portion 46, adapted to be positioned over the edge of offset portion 15 of the support. The lower portion of member 45 is similarly provided with a looped portion 47, adapted to surround the edge of the grating disc 20. The inner side of the rib 45 and its associated hook portion 47 are provided with a relatively flexible fin 48, adapted to brush against the disc, on both sides thereof, thus removing grated food therefrom before the same can be thrown off by centrifugal force.

Obviously, the device may be secured in position by any desired means, but must be readily removable from the disc for cleansing purposes. In the illustrative embodiment shown, it is sufficient to merely hook portion 46 over the top of the bracket, the shaft portion 17 serving, when the disc is rotated in a counter-clockwise direction as indicated in Figure 1, to preclude displacement of the member.

A modified form of supporting bracket is disclosed in Figure 6, wherein there is a supporting base 11a adapted to be secured to a horizontal surface as by means of screw 13a. The bracket includes a vertical upright 10a, having an aperture 10b therein for the accommodation of cylindrical member 17 and its associated parts, and continues in a horizontal portion 15a terminating in an offset 14a and a projection 14b.

The portion 14b is provided with studs 29a and 30a, the purpose of which corresponds to the previously described studs 29 and 30, while in the offset portion is a polished supporting block 40a, secured in position as by rivets or screws 41a, the block 40a corresponding in position and function to the previously described rollers 40.

A still further modification is disclosed in Figure 7, wherein a supporting bracket 10' includes an offset protion 14', and a flange 14'', the latter being provided with studs 29', for securing to the device the flange 26' of a food guiding chute 25'. In this modification, the rotary disc 20' is adapted to bear at a peripheral point against the inner surface of the flange 14'', which thus serves the same purpose as the previously described rollers 40 and block 40a. Obviously, the interior surface of flange 14'' may be highly polished if desired to provide a minimum of friction.

From the foregoing, it will now be seen that there is herein provided an improved vegetable grater, which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

What is claimed is:

In a food grater, a supporting bracket having an offset portion, means for securing one end of the bracket to a supporting surface, the offset end of the bracket being formed into a loop of a width equal to the width of the offset portion, the loop portion of the bracket having openings, an operating shaft extending through the openings, a handle formed at one end of the shaft for rotating the shaft, a grating disc secured to one end of the shaft to rotate therewith, spaced stub shafts mounted in the offset portion of the bracket and extending towards the disc, rollers mounted on the stub shafts and resting against the disc, a food guide chute pivotally mounted on the operating shaft adjacent to the rollers, a flange extending from the chute, studs extending from the bracket, said flange having openings accommodating the studs, pivotally supporting the chute on the bracket, and said chute guiding material to the grating disc to be grated.

WILSON A. MORAN.

REFERENCES CITED

The following references are of record in the file of this patent:

UNITED STATES PATENTS

| Number | Name | Date |
| --- | --- | --- |
| 675,284 | Matthiessen | May 28, 1901 |
| 903,307 | Nieland | Nov. 10, 1908 |
| 1,085,842 | Balgeman | Feb. 3, 1914 |
| 1,157,013 | Lewis | Oct. 19, 1915 |
| 1,158,153 | Albanese | Oct. 26, 1915 |
| 1,419,499 | Hartman | June 13, 1922 |
| 1,615,304 | Korner | Jan. 25, 1927 |
| 1,616,388 | Philaditakis | Feb. 1, 1927 |
| 1,743,113 | Campbell | Jan. 14, 1930 |

FOREIGN PATENTS

| Number | Country | Date |
| --- | --- | --- |
| 27,052 | Great Britain | Dec. 14, 1908 |